(12) United States Patent
Suzuki

(10) Patent No.: US 9,689,423 B2
(45) Date of Patent: Jun. 27, 2017

(54) ROLLING BEARING

(71) Applicant: JTEKT CORPORATION, Osaka-shi, Osaka (JP)

(72) Inventor: Akiyuki Suzuki, Nagoya (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/133,596

(22) Filed: Apr. 20, 2016

(65) Prior Publication Data

US 2016/0319873 A1    Nov. 3, 2016

(30) Foreign Application Priority Data

Apr. 28, 2015  (JP) ................. 2015-091397

(51) Int. Cl.
*F16C 33/46*   (2006.01)
*F16C 19/36*   (2006.01)

(52) U.S. Cl.
CPC ........ *F16C 19/364* (2013.01); *F16C 33/4635* (2013.01)

(58) Field of Classification Search
CPC . F16C 33/6651; F16C 33/6681; F16C 19/364
See application file for complete search history.

(56) References Cited

U.S. PATENT DOCUMENTS

| 2,219,031 | A  | * | 10/1940 | Frauenthal | F16C 33/6681 |
| | | | | | 384/572 |
| 4,787,757 | A  | * | 11/1988 | Finger | F16C 19/385 |
| | | | | | 384/470 |
| 6,742,934 | B2 | * | 6/2004 | Matsuyama | F16C 33/3856 |
| | | | | | 384/572 |
| 8,651,746 | B2 | * | 2/2014 | Sugita | F16C 19/163 |
| | | | | | 384/450 |
| 9,416,823 | B2 | * | 8/2016 | Okamoto | F16C 33/6681 |
| 2015/0176650 | A1 | * | 6/2015 | Suzuki | F16C 33/6681 |
| | | | | | 384/470 |

FOREIGN PATENT DOCUMENTS

JP    2005-069421 A    3/2005

* cited by examiner

*Primary Examiner* — Thomas R. Hannon
(74) *Attorney, Agent, or Firm* — Oliff PLC

(57) ABSTRACT

A cage has a small-diameter annular portion provided between an inner ring and an outer ring on a first side of a bearing in an axial direction and a plurality of cage bars extending from the small-diameter annular portion toward a second side of the bearing in the axial direction. In each of an inner peripheral surface and an outer peripheral surface of the small-diameter annular portion, recessed portions are formed which is each open toward a bearing exterior on the first side of the bearing in the axial direction. An inner wall of each recessed portion has an inclined surface that serves to enlarge a cross section of the recessed portion toward the bearing exterior on the first side of the bearing in the axial direction.

5 Claims, 8 Drawing Sheets

ROLLING BEARING

INCORPORATION BY REFERENCE

The disclosure of Japanese Patent Application No. 2015-091397 filed on Apr. 28, 2015 including the specification, drawings and abstract, is incorporated herein by reference in its entirety.

BACKGROUND OF THE INVENTION

1. Field of the Invention

The invention relates to a rolling bearing.

2. Description of the Related Art

A rolling bearing is used to support a shaft of a rotating portion included in a vehicle or a machine tool. A rolling bearing depicted in FIG. 12 is a tapered roller bearing 90. The tapered roller bearing 90 includes an inner ring 91, an outer ring 92, a plurality of tapered rollers 93, and an annular cage 94 (see, for example, Japanese Patent Application Publication No. 2005-69421 (JP 2005-69421 A). The tapered rollers 93 are provided between the inner ring 91 and the outer ring 92. The cage 94 holds the tapered rollers 93 at intervals in a circumferential direction.

Such a tapered roller bearing 90 is used, for example, for a transmission in an automobile, in order to support a shaft that rotates along with a gear. In this case, a lubricant stored in a housing of the transmission and used to lubricate the gear is also used to lubricate the tapered roller bearing 90.

In the tapered roller bearing 90 depicted in FIG. 12, a pump action resulting from rotation of the tapered roller bearing 90 causes the lubricant stored in the housing and that is present in a bearing exterior to flow from between a small-diameter-side end portion 95 of the cage 94 and an inner-ring outer periphery 96 and from between the small-diameter-side end portion 95 of the cage 94 and an outer-ring inner periphery 97 into a bearing interior where the tapered rollers 93 are present. The lubricant having flowed into the bearing interior passes through the bearing interior.

In the transmission in the automobile, the lubricant contains foreign matter such as abrasive powder resulting from manufacture of a gear or the like or wear debris resulting from driving of the gear. Therefore, when such foreign matter passes through the bearing interior along with the lubricant, the foreign matter may be caught between the tapered rollers 93 and raceway surfaces 91a and 92a. Consequently, rolling contact surfaces of the tapered rollers 93 and the raceway surfaces 91a and 92a may suffer surface roughness, leading to a shortened life of the bearing.

The shortened life of the bearing caused by the foreign matter contained in the lubricant is not limited to the tapered roller bearing 90 as depicted in FIG. 12. Other rolling bearings such as ball bearings and cylindrical roller bearings may suffer such a reduction in life.

SUMMARY OF THE INVENTION

It is an object of the invention to provide a rolling bearing that hinders foreign matter contained in a lubricant from entering a bearing interior.

According to an aspect of the invention, a rolling bearing includes: an inner ring; an outer ring; a plurality of rolling elements interposed between the inner ring and the outer ring; and an annular cage that holds the rolling elements. The cage has an annular portion provided between the inner ring and the outer ring on a first side of the bearing in an axial direction and a plurality of cage bars extending from the annular portion toward a second side of the bearing in the axial direction. In one or both of an inner peripheral surface and an outer peripheral surface of the annular portion, a recessed portion is formed which is open toward a bearing exterior on the first side of the bearing in the axial direction. An inner wall of the recessed portion has an inclined surface that serves to enlarge a cross section of the recessed portion toward the bearing exterior on the first side of the bearing in the axial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
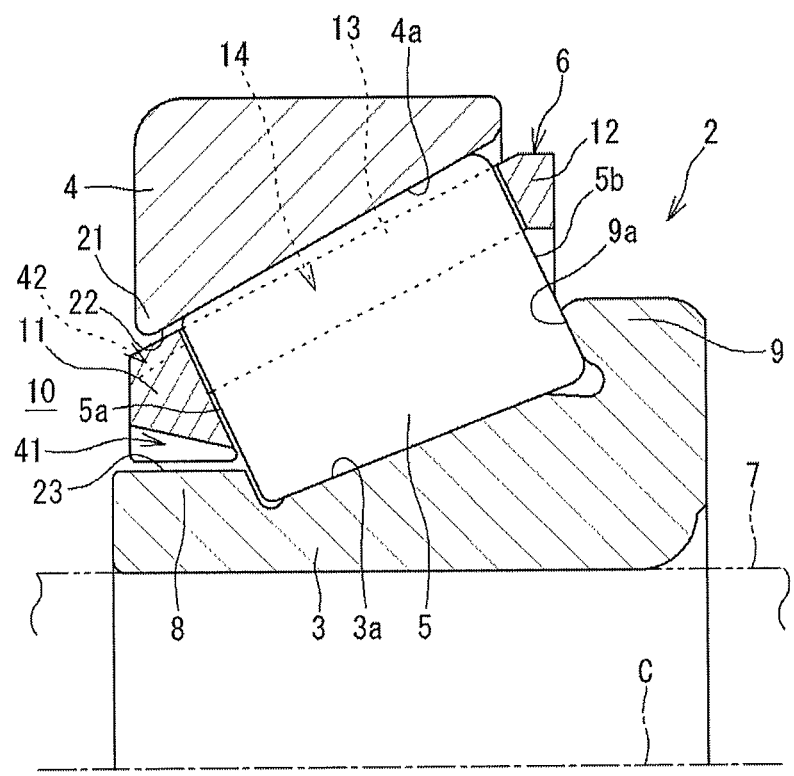
FIG. 1 is a longitudinal sectional view depicting an embodiment of a rolling bearing in the invention.

An embodiment of the invention will be described below based on the drawings. FIG. 1 is a longitudinal sectional view depicting an embodiment of a rolling bearing in the invention. The rolling bearing is a tapered roller bearing 2. The tapered roller bearing 2 includes an inner ring 3, an outer ring 4, a plurality of tapered rollers 5, and an annular cage 6. The tapered rollers 5 are interposed between the inner ring 3 and the outer ring 4. The cage 6 holds the tapered rollers 5.

In the present embodiment, the tapered roller bearing 2 is used for a transmission in an automobile. The tapered roller bearing 2 rotatably supports a shaft 7 rotating along with a gear in a housing of the transmission. In the housing, a lubricant (oil) that lubricates the gear is stored. The lubricant is also used to lubricate the tapered roller bearing 2. In such a transmission, the lubricant contains foreign matter such as abrasive powder resulting from manufacture of the gear or the like or wear debris resulting from driving of the gear.

The inner ring 3 is an annular member formed of bearing steel or carbon steels for machine structural use. On an outer periphery of the inner ring 3, a tapered inner-ring raceway surface 3a is formed on which the tapered rollers 5 roll. The inner ring 3 has a cone front face rib 8 (hereinafter referred to as a small rib) and a cone back face rib 9 (hereinafter referred to as a large rib). The small rib 8 is provided on a first side of the inner-ring raceway surface 3a in an axial direction (on a left side in FIG. 1) and protrudes outward in a radial direction. The large rib 9 is provided on a second side of the inner-ring raceway surface 3a in the axial direction (on a right side in FIG. 1) and protrudes outward in the radial direction.

Like the inner ring 3, the outer ring 4 is an annular member formed of bearing steel or carbon steels for machine structural use. On an inner periphery of the outer ring 4, a tapered outer-ring raceway surface 4a is formed which faces the inner-ring raceway surface 3a and on which the tapered rollers 5 roll.

The tapered rollers 5 are members formed of bearing steel or the like and roll on the inner-ring raceway surface 3a and the outer-ring raceway surface 4a. Each of the tapered rollers 5 has a roller small end face 5a having a small diameter and located on the first side of the tapered roller 5 in the axial direction and a roller large end face 5b having a large diameter and located on the second side of the tapered roller 5 in the axial direction. The roller large end face 5b contacts a rib surface 9a of the large rib 9.

The cage 6 has a small-diameter annular portion 11, a large-diameter annular portion 12, and a plurality of cage bars 13. The small-diameter annular portion 11 is provided between the inner ring 3 and the outer ring 4 on the first side of the bearing in the axial direction. The large-diameter annular portion 12 is provided between the inner ring 3 and the outer ring 4 on the second side of the bearing in the axial direction. The cage bars 13 extend from the small-diameter annular portion 11 toward the second side of the bearing in the axial direction. The small-diameter annular portion 11 and the large-diameter annular portion 12 are shaped like rings and provided at a predetermined distance from each other in the axial direction. The cage bars 13 are provided at intervals in a circumferential direction to couple the annular portions 11 and 12 together. The circumferential direction is a direction around a central line C of the tapered roller bearing 2.

Pockets 14 that house (hold) the respective tapered rollers 5 are spaces each defined between the annular portions 11 and 12 and between two cage bars 13 adjacent to each other in the circumferential direction. The cage 6 may be formed of metal. However, the cage 6 in the present embodiment is formed of resin (synthetic resin) and can be shaped by ejection molding. The cage 6 formed of resin facilitates molding of a recessed portion 41 (42) described below.

Figure 2:
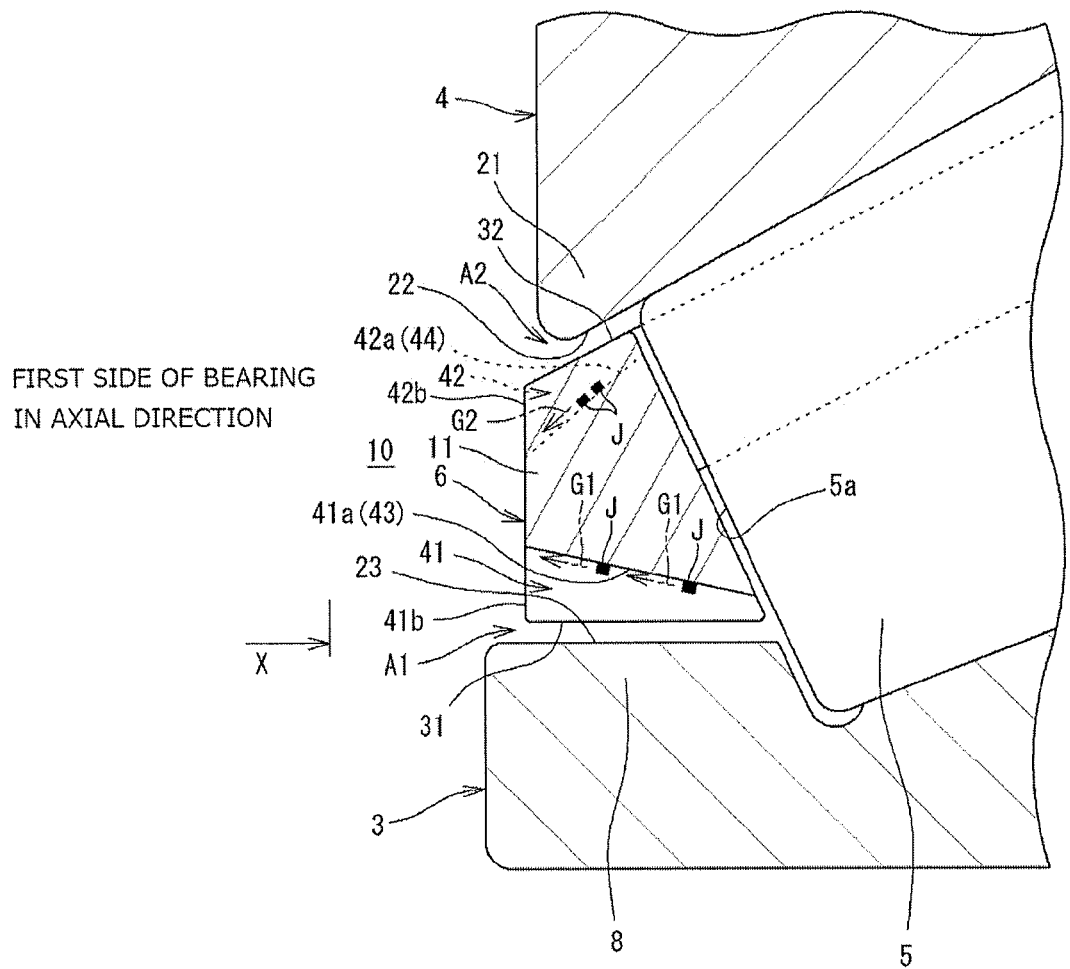
FIG. 2 is an enlarged sectional view depicting a small-diameter annular portion of a cage and a periphery of the small-diameter annular portion.

FIG. 2 is an enlarged sectional view of the small-diameter annular portion 11 of the cage 6 and a periphery of the small-diameter annular portion 11. The small-diameter annular portion 11 of the present embodiment is positioned between an end portion 21 of the outer ring 4 on the first side of the bearing in the axial direction (hereinafter referred to as an outer ring end portion 21) and the small rib 8 that is an end portion of the inner ring 3 on the first side of the bearing in the axial direction (hereinafter referred to as an inner ring end portion 8). An inner peripheral surface 31 of the small-diameter annular portion 11 faces an outer peripheral surface 23 of the inner ring end portion 8 with an annular clearance A1 therebetween. An outer peripheral surface 32 of the small-diameter annular portion 11 faces an inner peripheral surface 22 of the outer ring end portion 21 with an annular clearance A2 therebetween. In the embodiment, the outer peripheral surface 23 of the inner ring end portion 8 and the inner peripheral surface 31 of the small-diameter annular portion 11 are shaped along a straight cylindrical surface centered around the central line C (see FIG. 1). The inner peripheral surface 22 of the outer ring end portion 21 and the outer peripheral surface 32 of the small-diameter annular portion 11 are shaped along a conical surface centered around the central line C (see FIG. 1) of the tapered roller bearing 2.

The outer peripheral surface 23 of the inner ring end portion 8 and the inner peripheral surface 31 of the small-diameter annular portion 11 are in close proximity to each other. The radial dimension of the annular clearance A1 is set to have a very small value (for example, smaller than 1.5 mm for a radius). The inner peripheral surface 22 of the outer ring end portion 21 and the outer peripheral surface 32 of the small-diameter annular portion 11 are in close proximity to each other. The radial dimension of the annular clearance A2 is set to have a very small value (for example, smaller than 1.5 mm for a radius). As described above, an annular opening is formed between the inner ring end portion 8 and the outer ring end portion 21. The small-diameter annular portion 11 is configured to close the opening with the very small annular clearances A1 and A2.

In the tapered roller bearing 2 depicted in FIG. 1, the inner peripheral surface (outer-ring raceway surface 4a) of the outer ring 4 has a diameter increasing from the first side to the second side of the bearing in the axial direction. Thus, rotation of the tapered roller bearing 2 (in the present embodiment, the inner ring 3) produces an effect in which a lubricant flows through an annular space formed between the inner ring 3 and the outer ring 4 from the first side toward the second side of the bearing in the axial direction (pump action). Such a pump action resulting from the rotation of the tapered roller bearing 2 enables a lubricant in a bearing exterior 10 to flow from the first side of the bearing in the axial direction into the annular space between the inner ring 3 and the outer ring 4. The lubricant having flowed into the annular space flows out through the second side of the bearing in the axial direction. In other words, the lubricant passes through a bearing interior where the tapered rollers 5 are present. As described above, in the tapered roller bearing 2 depicted in FIG. 1, the first side of the bearing in the axial direction corresponds to an inflow side for the lubricant, whereas the second side of the bearing in the axial direction corresponds to an outflow side for the lubricant.

Figure 3:
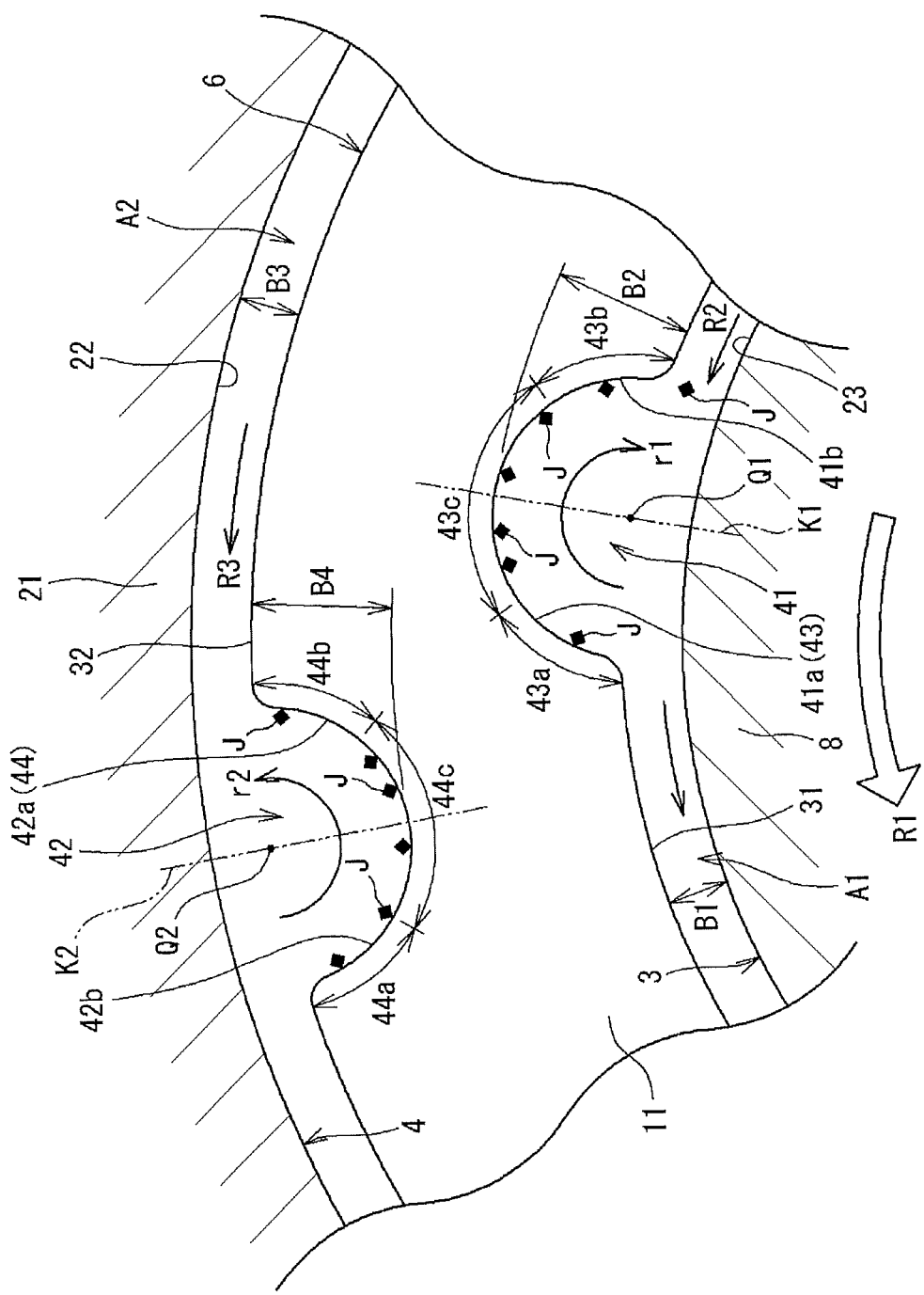
FIG. 3 is a diagram depicting a part of a tapered roller bearing as viewed in a direction of arrow X in FIG. 2.

FIG. 3 is a diagram illustrating a part of the tapered roller bearing 2 as viewed in a direction of arrow X in FIG. 2, As depicted in FIG. 2 and FIG. 3, in the inner peripheral surface 31 and the outer peripheral surface 32 of the small-diameter annular portion 11, recessed portions 41 and 42, respectively, are formed which are open toward the bearing exterior 10 on the first side of the bearing in the axial direction. The recessed portions may be formed exclusively in one of the inner and outer peripheral surfaces 31 and 32 of the small-diameter annular portion 11.

Figure 4:
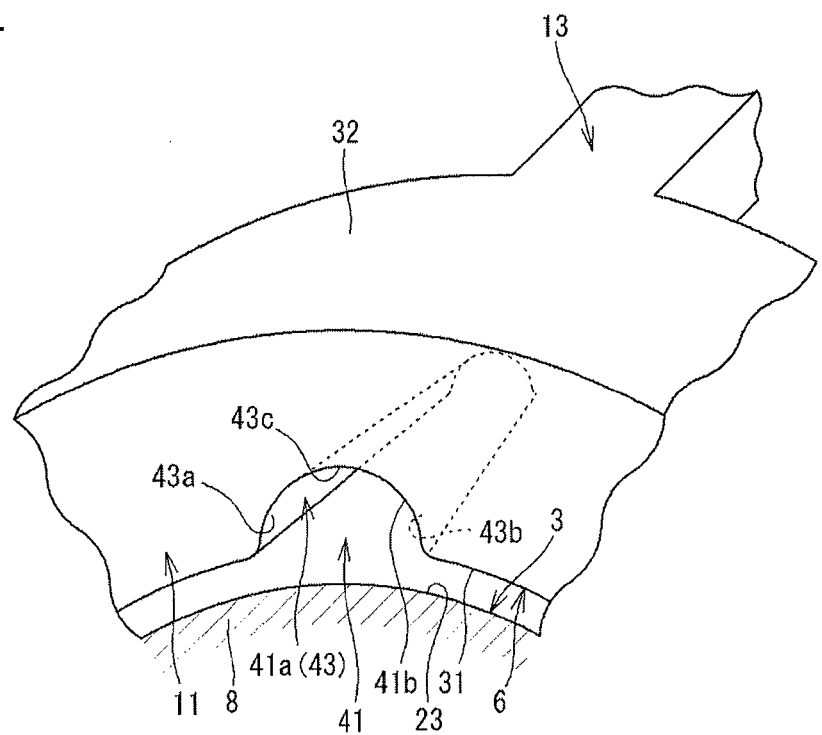
FIG. 4 is a perspective view of a part of the small-diameter annular portion as viewed at a first side of the small-diameter annular portion in an axial direction.

FIG. 4 is a perspective view of a part of the small-diameter annular portion 11 as viewed at the first side of the small-diameter annular portion 11 in the axial direction. As depicted in FIG. 2 and FIG. 4, an inner wall 41a of each of the recessed portions 41 in the inner peripheral surface 31 is an inclined surface 43. The inclined surface 43 serves to enlarge a cross section of the recessed portion 41 toward the first axial-side bearing exterior 10. In other words, the recessed portion 41 has the largest cross section at a first axial-side opening end 41b of the recessed portion 41. The cross section is a section orthogonal to the central line C (see FIG. 1) of the tapered roller bearing 2. Multiple recessed portions 41 are formed along the inner peripheral surface 31.

Figure 5:
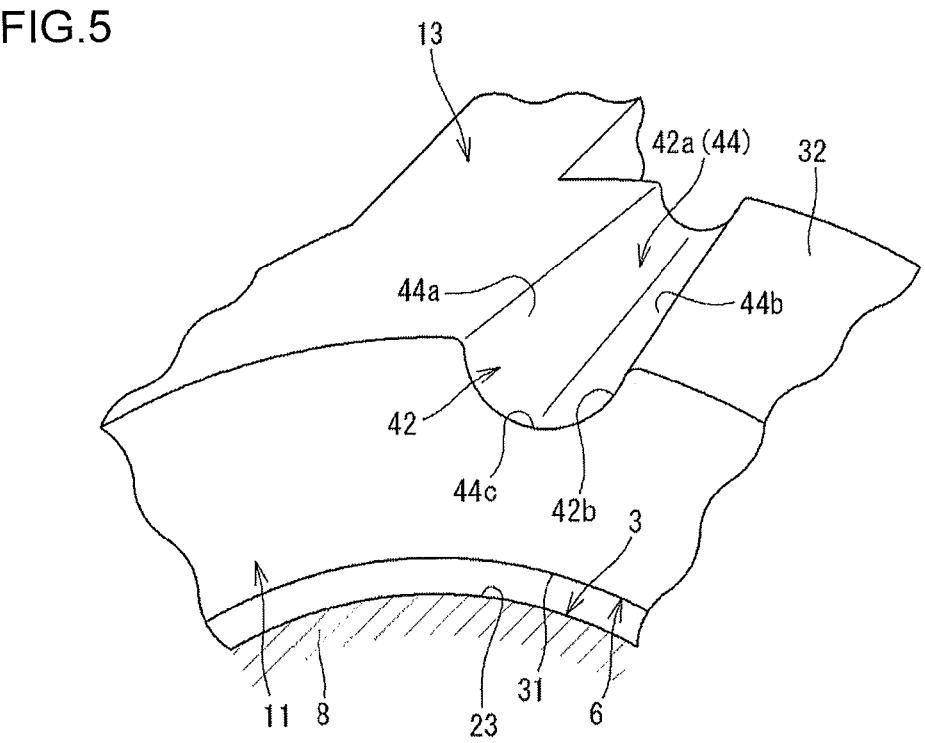
FIG. 5 is a perspective view of another part of the small-diameter annular portion as viewed at the first side of the small-diameter annular portion in the axial direction.

FIG. 5 is a perspective view of another part of the small-diameter annular portion 11 as viewed at the first side of the bearing in the axial direction. As depicted in FIG. 2 and FIG. 5, an inner wall 42a of each of the recessed portions 42 in the outer peripheral surface 32 is an inclined surface 44. The inclined surface 44 serves to enlarge a cross section of the recessed portion 42 toward the bearing exterior 10 on the first side of the bearing in the axial direction. In other words, the recessed portion 42 has the largest cross section at an opening end 42b of the recessed portion 42 on the first side thereof in the axial direction. Multiple recessed portions 42 are formed along the outer peripheral surface 32.

In the tapered roller bearing 2 with the cage 6 as described above, rotation of the bearing (in the present embodiment, rotation of the inner ring 3 in a direction of arrow R1) causes the lubricant to flow through the annular clearance A1 between the inner ring 3 and the small-diameter annular portion 11 in the same direction as the bearing rotating direction (in FIG. 3, in a direction of arrow R2) as depicted in FIG. 3. When the lubricant flows along the annular clearance A1, a portion of the lubricant enters each of the recessed portions 41 to cause a vortex of the lubricant in the recessed portion 41 (the vortex depicted by arrow r1). A centrifugal force of the vortex causes foreign matter J contained in the lubricant to be pressed against the inner wall 41a of the recessed portion 41. In particular, the foreign matter J is formed of metal as described above and thus has a larger specific gravity than the lubricant. Thus, in the recessed portion 41, a stronger centrifugal force acts on the foreign matter J than on the lubricant. Hence, the foreign matter J is separated from the flow of the lubricant and pressed against the inner wall 41a. The inner wall 41a of the recessed portion 41 is the inclined surface 43 as described above. Consequently, the foreign matter J pressed against the inclined surface 43 is discharged to the bearing exterior 10 along the surface (inclined surface 43) (see arrow G1 depicted in FIG. 2). Accordingly, the foreign matter J contained in the lubricant is hindered from entering, through the annular clearance A1, the bearing interior where the tapered rollers 5 are present.

In the present embodiment, the recessed portions 42, which have a similar function, are also formed in the outer peripheral surface 32 of the small-diameter annular portion 11. In other words, rotation of the bearing (in the present embodiment, rotation of the inner ring 3 in the direction of arrow R1) causes the lubricant to flow through the annular clearance A2 between the outer ring 4 and the small-diameter annular portion 11 in the same direction as the bearing rotating direction (in FIG. 3, in a direction of arrow R3) as depicted in FIG. 3. When the lubricant flows along the annular clearance A2, a portion of the lubricant enters each of the recessed portions 42 to cause a vortex of the lubricant in the recessed portion 42 (the vortex depicted by arrow r2). A centrifugal force of the vortex causes the foreign matter J contained in the lubricant to be pressed against the inner wall 42a of the recessed portion 42. The inner wall 42a of the recessed portion 42 is the inclined surface 44 as described above. Consequently, the foreign matter J pressed against the inclined surface 44 is discharged to the bearing exterior 10 along the surface (inclined surface 44) (see arrow G2 depicted in FIG. 2). Accordingly, the foreign matter J contained in the lubricant is hindered from entering, through the annular clearance A2, the bearing interior where the tapered rollers 5 are present.

In the present embodiment, the inner wall 41a of each of the recessed portions 41 and the inner wall 42a of each of the recessed portions 42 are shaped along a conical surface centered around a straight line parallel to the central line C (see FIG. 1) of the tapered roller bearing 2 (see FIG. 4 and FIG. 5). Each of the recessed portions 41 and 42 has a semi-circular cross section. Thus, the inner wall 41a of the recessed portion 41 is entirely the inclined surface 43. The inner wall 42a of the recessed portion 42 is entirely the inclined surface 44.

The inner walls 41a and 42a will further be described. In FIG. 3, the inner wall 41a of each of the recessed portions 41 formed at the inner periphery of the small-diameter annular portion 11 is separated into side surface portions 43a and 43b that face each other in the circumferential direction and a bottom surface portion 43c located between the side surface portions 43a and 43b facing each other. In the present embodiment, both the pair of side surface portions 43a and 43b and the bottom surface portion 43c form the inclined surface 43 (see FIG. 4). In other words, the bottom surface portion 43c forms a part of the inclined surface 43 extending outward in the radial direction toward the bearing exterior on the first side of the bearing in the axial direction. The side surface portions 43a and 43b form respective parts of the inclined surface 43 the distance between which increases toward the bearing exterior on the first side of the bearing in the axial direction. Thus, all the surfaces of the inner wall 41a can be expected to provide the function to discharge the foreign matter J.

In FIG. 3, the inner wall 42a of the recessed portion 42 formed at the outer periphery of the small-diameter annular portion 11 is separated into side surface portions 44a and 44b that face each other in the circumferential direction and a bottom surface portion 44c located between the side surface portions 44a and 44b facing each other. In the present embodiment, both the pair of side surface portions 44a and 44b and the bottom surface portion 44c form the inclined surface 44 (see FIG. 5). In other words, the bottom surface portion 44c forms a part of the inclined surface 44 extending inward in the radial direction toward the bearing exterior on the first side of the bearing in the axial direction. The side surface portions 44a and 44b form respective parts of the inclined surface 44 the distance between which increases toward the bearing exterior on the first side of the bearing in the axial direction. Thus, all the surfaces of the inner wall 42a can be expected to provide the function to discharge the foreign matter J.

The recessed portions 41 and 42 may be in a form other than the form depicted in FIGS. 2 to 5. Other forms of the recessed portions 41 and 42 will be described below. For these forms, the recessed portion 41 formed at the inner periphery of the small-diameter annular portion 11 will be described. However, a configuration similar to the configuration of the inner-peripheral recessed portion 41 may be adopted for the recessed portion 42 formed at the outer periphery of the small-diameter annular portion 11. The inner-peripheral recessed portion 41 and the outer-peripheral recessed portion 42 may have different forms.

Figure 6:
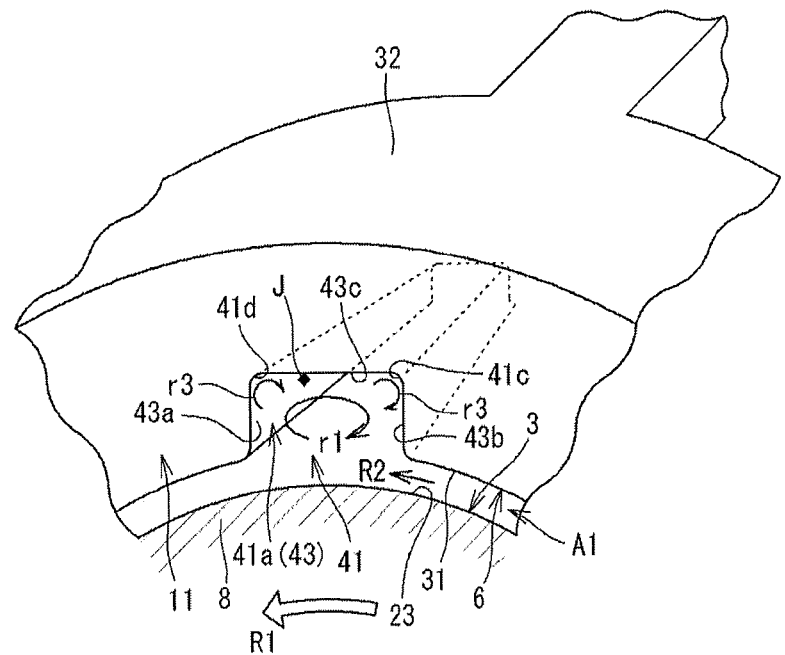
FIG. 6 is a perspective view of a part of the small-diameter annular portion as viewed at the first side of the small-diameter annular portion in the axial direction.

FIG. 6 is a perspective view of the small-diameter annular portion 11 with the recessed portions 41 formed therein as viewed at the first side of the small-diameter annular portion 11 in the axial direction. Each of the recessed portions 41 has a rectangular cross section (shaped like a rectangle with small round recessed corners 41c and 41d). The recessed portion 41 is formed in the inner peripheral surface 31 of the small-diameter annular portion 11 and is open toward the bearing exterior on the first side of the bearing in the axial direction as is the case with FIG. 4. The inner wall 41a of the recessed portion 41 has the inclined surface 43 that serves to enlarge the cross section of the recessed portion 41 toward the bearing exterior on the first side of the bearing in the axial direction.

In the form depicted in FIG. 6, rotation of the bearing (rotation of the inner ring 3 in the direction of arrow R1) causes the lubricant to flow through the annular clearance A1 between the inner ring 3 and the small-diameter annular portion 11 in the same direction as the bearing rotating direction (in FIG. 6, the direction of arrow R2). When the lubricant flows along the annular clearance A1, a portion of the lubricant enters the recessed portion 41 to cause a vortex of the lubricant in the recessed portion 41 (the vortex depicted by arrow r1). A centrifugal force of the vortex causes foreign matter J contained in the lubricant to be pressed against the inner wall 41a of the recessed portion 41. The inner wall 41a of the recessed portion 41 has the inclined surface 43 as described above. Consequently, an effect similar to the effect produced in the form depicted in FIG. 4 causes the foreign matter J pressed against the inclined surface 43 to be discharged to the bearing exterior 10 along the surface (inclined surface 43).

The inner wall 41a has the side surface portions 43a and 43b facing each other in the circumferential direction and the bottom surface portion 43c located between the side surface portions 43a and 43b facing each other. In the present embodiment, both the pair of side surface portions 43a and 43b and the bottom surface portion 43c form the inclined surface 43. Thus, all the surfaces of the inner wall 41a can be expected to provide the function to discharge the foreign matter J. As described above, the foreign matter J contained in the lubricant is hindered from entering, through the annular clearance A1, the bearing interior where the tapered rollers 5 are present.

When the recessed portion 41 has a rectangular cross section as depicted in FIG. 6, the two corners 41c and 41d are formed in the recessed portion 41. Thus, vortexes with smaller turning radii (the vortexes depicted by arrows r3) occur in the corners 41c and 41d. A centrifugal force increases with decreasing turning radius. Consequently, the foreign matter J contained in the lubricant is more easily pressed against the inner wall 41a of the recessed portion 41 at the corners 41c and 41d thereof. Since the inner wall 41a has the inclined surface 43, the foreign matter J pressed against the inner wall 41a is discharged to the bearing exterior along the inclined surface 43.

Figure 7:
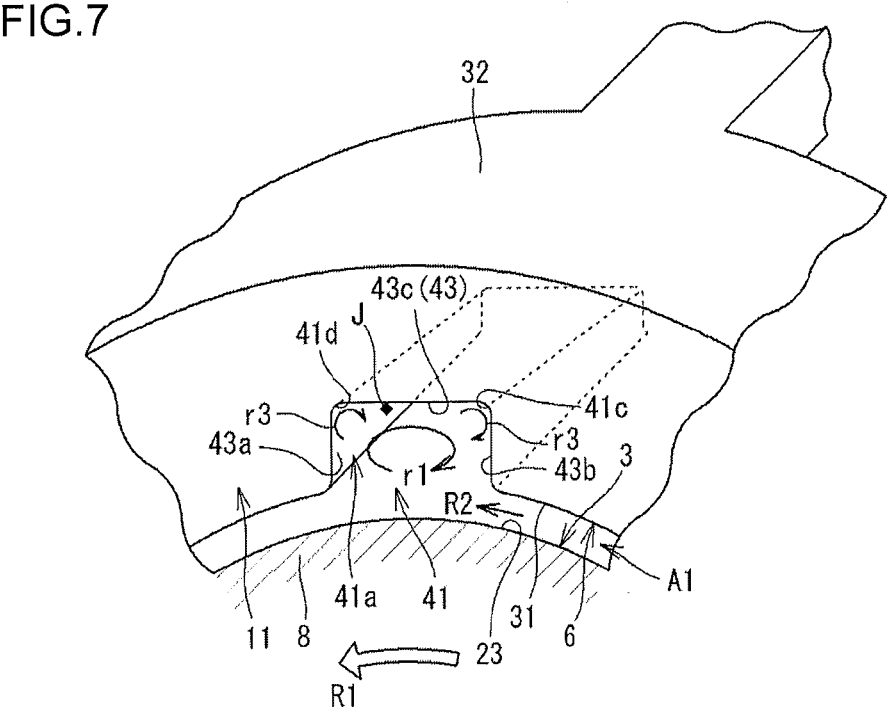
FIG. 7 is a perspective view depicting a variation 1 of the recessed portion depicted in FIG. 6.

FIG. 7 is a perspective view depicting a variation 1 of the recessed portion 41 illustrated in FIG. 6. Like the recessed portion 41 illustrated in FIG. 6, the recessed portion 41 in the variation 1 is formed in the inner peripheral surface 31 of the small-diameter annular portion 11 and is open toward the bearing exterior on the first side of the bearing in the axial direction. The inner wall 41a of the recessed portion 41 has the inclined surface 43 that serves to enlarge the cross section of the recessed portion 41 toward the bearing exterior on the first side of the bearing in the axial direction. The recessed portion 41 depicted in FIG. 7 is rectangular. The inner wall 41a has the side surface portions 43a and 43b facing each other in the circumferential direction and the bottom surface portion 43c located between the side surface portions 43a and 43b facing each other. Only the bottom surface portion 43c forms the inclined surface 43. In other words, the side surface portions 43a and 43b facing each other are surfaces parallel to each other. Thus, the bottom surface portion 43c of the inner wall 41a can be expected to provide the function to discharge the foreign matter J.

Figure 8:
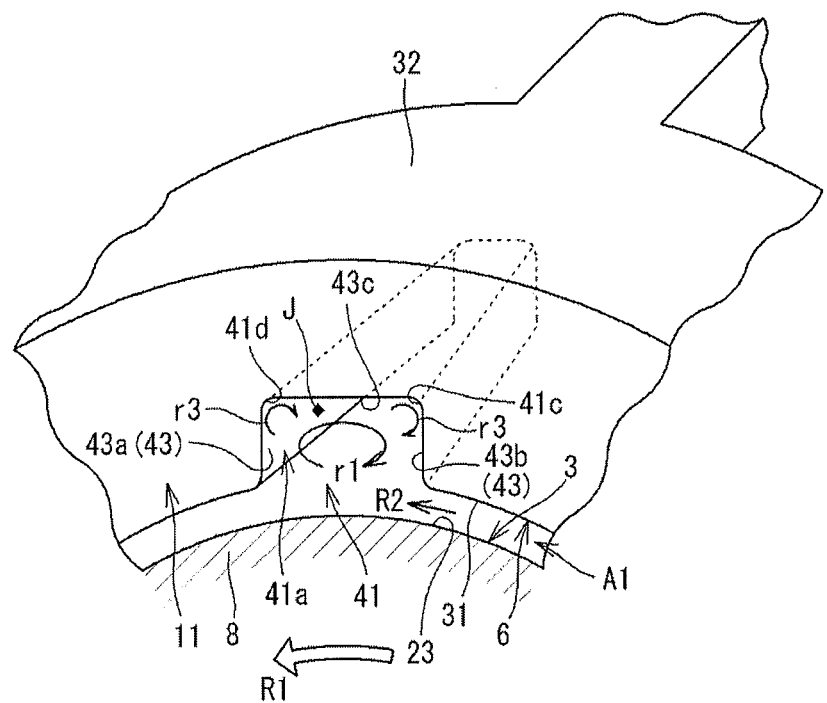
FIG. 8 is a perspective view depicting a variation 2 of the recessed portion depicted in FIG. 6.

FIG. 8 is a perspective view depicting a variation 2 of the recessed portion 41 illustrated in FIG. 6. Like the recessed portion 41 illustrated in FIG. 6, the recessed portion 41 in the variation 2 is formed in the inner peripheral surface 31 of the small-diameter annular portion 11 and is open toward the bearing exterior on the first side of the bearing in the axial direction. The inner wall 41a of the recessed portion 41 has the inclined surface 43 that serves to enlarge the cross section of the recessed portion 41 toward the bearing exterior on the first side of the bearing in the axial direction. The recessed portion 41 depicted in FIG. 8 has a rectangular cross section. The inner wall 41a has the side surface portions 43a and 43b facing each other in the circumferential direction and the bottom surface portion 43c located between the side surface portions 43a and 43b facing each other. The side surface portions 43a and 43b form the inclined surface 43. The bottom surface portion 43c is parallel to the inner peripheral surface 31 of the small-diameter annular portion 11. Thus, the side surface portions 43a and 43b of the inner wall 41a can be expected to provide the function to discharge the foreign matter J.

In the forms depicted in FIG. 6, FIG. 7, and FIG. 8, respectively, the recessed portion 41 has a rectangular (quadrangular) cross section. However, the cross section may be pentagonal or hexagonal.

Figure 9:
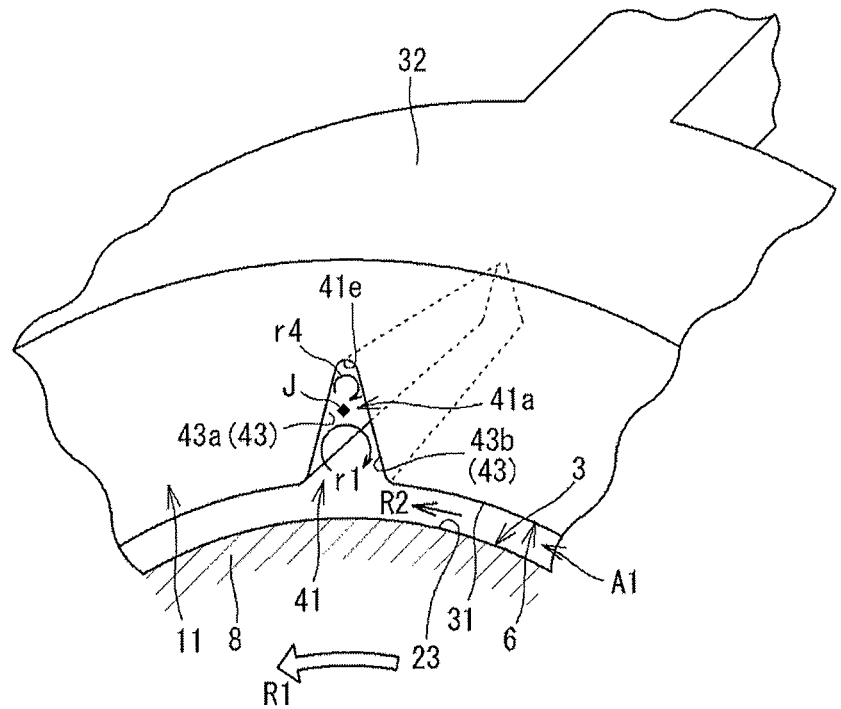
FIG. 9 is a perspective view depicting a variation 3 of the recessed portion depicted in FIG. 6.

FIG. 9 is a perspective view depicting a variation 3 of the recessed portion 41 illustrated in FIG. 6. Like the recessed portion 41 illustrated in FIG. 6, the recessed portion 41 in the variation 3 is formed in the inner peripheral surface 31 of the small-diameter annular portion 11 and is open toward the bearing exterior on the first side of the bearing in the axial direction. The inner wall 41a of the recessed portion 41 has the inclined surface 43 that serves to enlarge the cross section of the recessed portion 41 toward the bearing exterior on the first side of the bearing in the axial direction.

The recessed portion 41 depicted in FIG. 9 has a triangular cross section (shaped like a triangle with a small round recessed vertex 41e). The inner wall 41a of the recessed portion 41 has the side surface portions 43a and 43b that face each other in the circumferential direction. The side surface portions 43a and 43b form the inclined surface 43. Thus, the side surface portions 43a and 43b of the inner wall 41a can be expected to provide the function to discharge the foreign matter J.

When the recessed portion 41 has a triangular cross section, a vortex with a much smaller turning radius (the vortex depicted by arrow r4) occurs in a small space at the vertex 41e of the recessed portion 41. A centrifugal force increases with decreasing turning radius. Consequently, the foreign matter J contained in the lubricant is more easily pressed against the inner wall 41a at the vertex of the recessed portion 41. Since the inner wall 41a has the inclined surface 43, the foreign matter J pressed against the inner wall 41a is discharged to the bearing exterior along the inclined surface 43.

Figure 10:
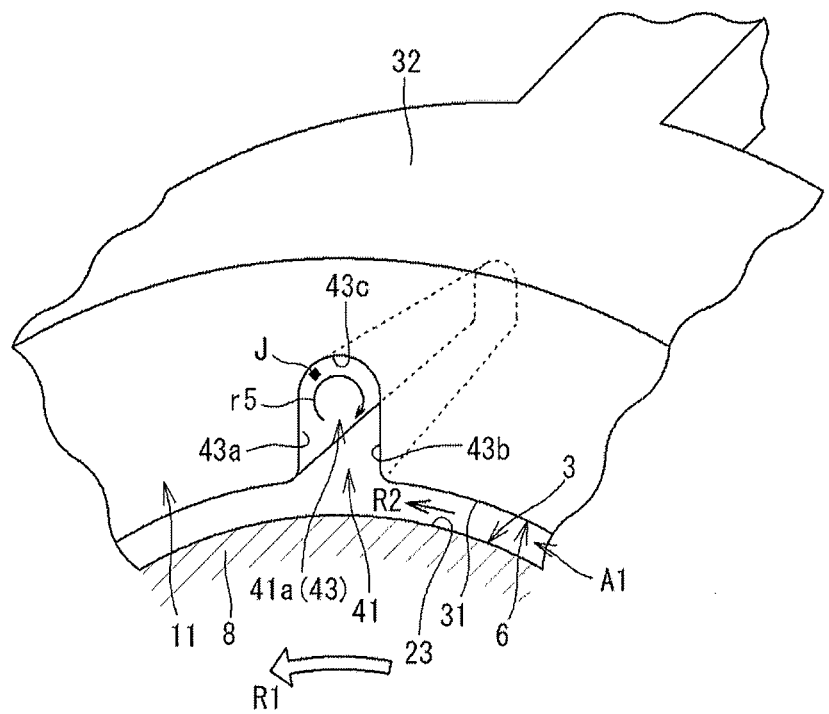
FIG. 10 is a perspective view depicting a variation 4 of the recessed portion depicted in FIG. 4.

FIG. 10 is a perspective view depicting a variation 4 of the recessed portion 41 illustrated in FIG. 4. Like the recessed portion 41 illustrated in FIG. 4, the recessed portion 41 in the variation 4 is formed in the inner peripheral surface 31 of the small-diameter annular portion 11 and is open toward the bearing exterior on the first side of the bearing in the axial direction. The inner wall 41a of the recessed portion 41 is the inclined surface 43 that serves to enlarge the cross section of the recessed portion 41 toward the bearing exterior on the first side of the bearing in the axial direction. The inner wall 41a has the side surface portions 43a and 43b facing each other in the circumferential direction and the bottom surface portion 43c located between the side surface portions 43a and 43b facing each other. In the variation 4, both the pair of side surface portions 43a and 43b and the bottom surface portion 43c form the inclined surface 43. Thus, all the surfaces of the inner wall 41a can be expected to provide the function to discharge the foreign matter J.

In the recessed portion 41 depicted in FIG. 10, the bottom surface portion 43c has a circular arc-shaped cross section, whereas each of the side surface portions 43a and 43b is a flat surface. The inner wall 41a of the recessed portion 41 has a semi-oblong (semi-elliptic) cross section. This enables a vortex of the lubricant to be reliably generated at the inside of the recessed portion 41, in other words, at the bottom surface portion 43c.

As a representative of the forms depicted in FIGS. 3 to 10, the form in FIG. 3 will be described. Each of the recessed portions 41 (42) has a symmetric cross section. In other words, each of the recessed portions 41 (42) is symmetric about a radial virtual line K1 (K2) passing through the center Q1 (Q2) of the cross section of the recessed portion 41 (42) and the center of the tapered roller bearing 2. Thus, a half of the recessed portion 41 (42) in the circumferential direction and the other half of the recessed portion 41 (42) in the circumferential direction are line-symmetric. In this manner, in the cross section of the recessed portion 41 (42), the half of the recessed portion 41 (42) in the circumferential direction and the other half of the recessed portion 41 (42) in the circumferential direction are shaped to be symmetric. Consequently, the tapered roller bearing 2 can consistently provide the function to discharge the foreign matter to the bearing exterior using the recessed portions 41 (42) regardless of the rotating direction of the bearing. In other words, although, in the form depicted in FIG. 3, the inner ring 3 rotates in the direction of arrow R1, the effect can also be exerted in which the foreign matter is discharged to the bearing exterior using the recessed portions 41 (42), even when the inner ring 3 rotates in the direction opposite to the direction of arrow R1.

Figure 11:
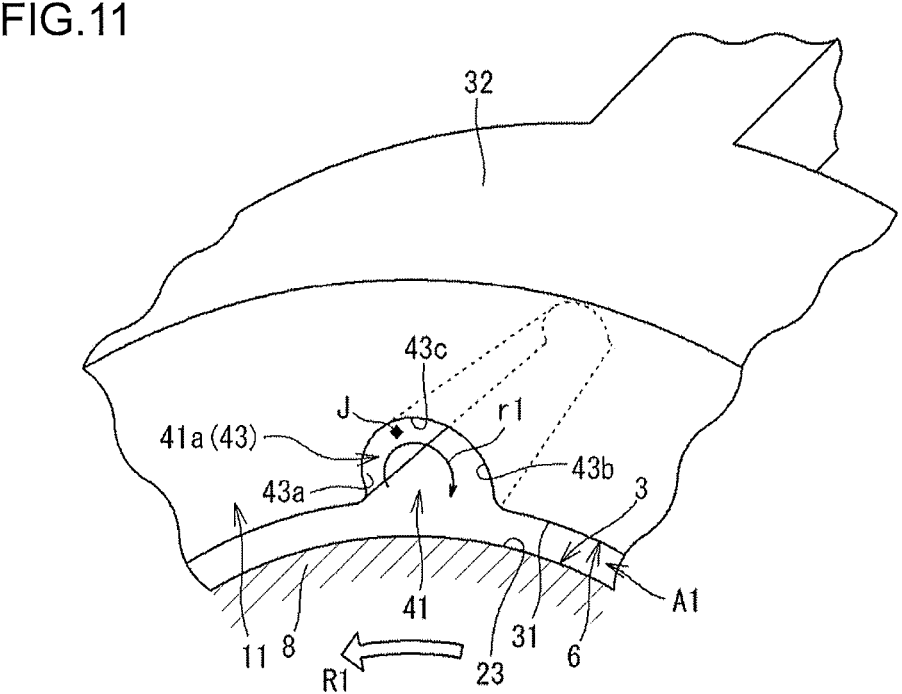
FIG. 11 is a perspective view depicting a variation 5 of the recessed portion depicted in FIG. 4.
Figure 12:
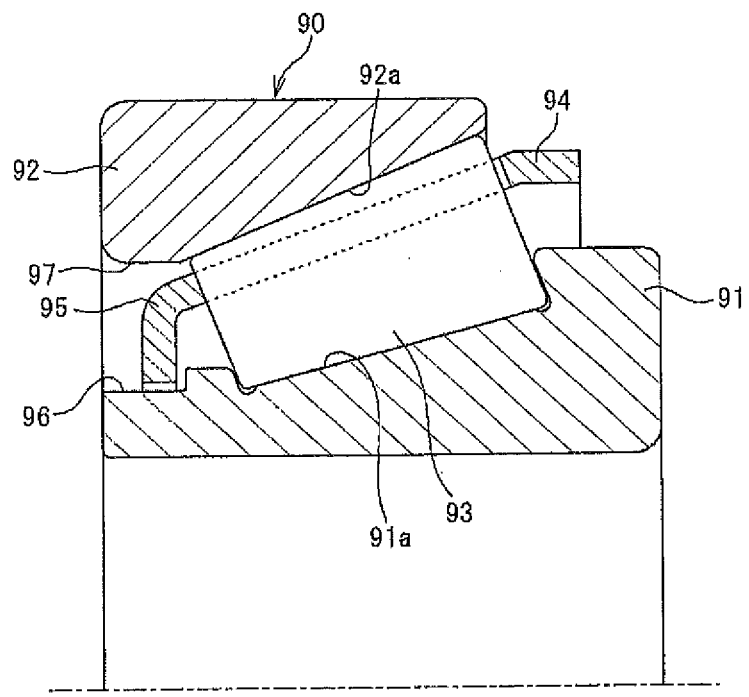
FIG. 12 is a longitudinal sectional view of a conventional rolling bearing.

In contrast, in the cross section of each of the recessed portions 41, the half of the recessed portion 41 in the circumferential direction and the other half of the recessed portion 41 in the circumferential direction may be shaped to be asymmetric, as depicted in FIG. 11. In the form depicted in FIG. 11, in the cross section of the recessed portion 41, the half of the recessed portion 41 in the circumferential direction is shaped like a dovetail groove in which the opening of the half of the recessed portion 41 to the inner peripheral surface 31 is narrow. The other half of the recessed portion 41 in the circumferential direction is shaped like a circular arc in which the opening of the other half of the recessed portion 41 to the inner peripheral surface 31 is wide (the opening is not narrowed). In this case, when the bearing rotates counterclockwise, in other words, in the direction of arrow R1 in FIG. 11, a vortex of the lubricant can be effectively generated in the recessed portion 41.

In the above-described forms (the form in FIG. 3 is described as a representative), the annular clearance A1 is provided between the inner ring 3 and the small-diameter annular portion 11. The annular clearance A2 is provided between the outer ring 4 and the small-diameter annular portion 11. A radial dimension B1 of the annular clearance A1 at the inner ring 3 is smaller than a radial dimension B2, at the opening end 41b on the first side of the bearing in the axial direction, of each of the recessed portions 41, which is open toward the annular clearance A1 (B1<B2). Thus, the foreign matter J contained in the lubricant flowing through the annular clearance A1 can be made to efficiently enter the recessed portion 41. The foreign matter J can then be discharged to the bearing exterior. Given that the radial dimension B1 of the annular clearance A1 is larger (than the radial dimension B2) (B1>B2) though this is not depicted in the drawings, the foreign matter J flowing in conjunction with the lubricant along the outer peripheral surface 23 of the inner ring 3 is particularly hindered from flowing to the recessed portion 41. However, in the present embodiment (B1<B2), even when the lubricant containing the foreign matter J flows along the outer peripheral surface 23 of the inner ring 3, the foreign matter J flows more easily to the recessed portion 41 in conjunction with the lubricant. Consequently, the foreign matter J can be discharged to the bearing exterior.

A radial dimension B3 of the annular clearance A2 at the outer ring 4 is smaller than a radial dimension B4, at the opening end 42b on the first side of the bearing in the axial direction, of each of the recessed portions 42, which is open toward the annular clearance A2 (B3<B4). Thus, the foreign matter J contained in the lubricant flowing through the annular clearance A2 can be made to efficiently enter the recessed portion 42. The foreign matter J can then be discharged to the bearing exterior.

In the above-described embodiments, the recessed portions 41 formed in the inner peripheral surface 31 of the small-diameter annular portion 11 and the recessed portions 42 formed in the outer peripheral surface 32 of the small-diameter annular portion 11 are each open toward the first side of the bearing in the axial direction and also toward the second side of the bearing in the axial direction (toward the tapered rollers 5) and penetrate the small-diameter annular portion 11 in the axial direction (see FIG. 2). However, the openings of the recessed portions on the second side of the bearing in the axial direction are closed by the roller small end faces 5a of the tapered rollers 5. Although not depicted in the drawings, the recessed portions 41 (42) may be configured to be open toward the first side of the bearing in the axial direction (toward the bearing exterior) but not to be open toward the second side of the bearing in the axial direction (toward the tapered rollers 5).

In the tapered roller bearing 2 (see FIG. 1) in each of the forms as described above, the recessed portions 41 (42) are formed in the small-diameter annular portion 11 provided in the cage 6. Each of the recessed portions 41 (42) has a cross section that enlarges toward the bearing exterior 10 on the first side of the bearing in the axial direction. Consequently, a vortex of the lubricant occurs in the recessed portion 41 (42) to press the foreign matter J contained in the lubricant against the inclined surface 43 (44) of the recessed portion 41 (42) due to the centrifugal force of the vortex. The foreign matter J is then discharged to the bearing exterior along the inclined surface 43 (44). Consequently, the foreign matter J contained in the lubricant is hindered from entering the bearing interior, enabling shortening of the bearing life to be suppressed.

In particular, in the present embodiment, the lubricant present in the bearing exterior 10 on the first side of the bearing in the axial direction flows in between the inner ring 3 and the outer ring 4 through the annular clearances A1 and A2 as a result of the pump action resulting from rotation of the bearing as described above. The present embodiment is effective for separating the foreign matter J from the lubricant passing through the annular clearances A1 and A2 by use of the recessed portions 41 (42) and returning the foreign matter J to the bearing exterior 10 on the first side of the bearing in the axial direction. As a result, even when the lubricant enters the bearing interior, the foreign matter J is hindered from entering the bearing interior, enabling shortening of the bearing life to be suppressed.

The recessed portion 41 (42) in each of the above-described embodiments has a cross section decreasing in size toward the tapered rollers 5. For example, in the form depicted in FIG. 4, the inner wall 41a of the recessed portion 41 is shaped along the conical surface. As depicted in FIG. 2, the radius of the recessed portion 41 in the cross section decreases toward the tapered roller 5. Thus, a centrifugal force acts on the foreign matter J contained in the lubricant flowing through the recessed portion 41 in the form of a vortex. Since the centrifugal force increases with decreasing turning radius, a strong centrifugal force is generated at an inner portion of the recessed portion 41, which is closer to the tapered rollers 5, and causes the foreign matter J to be more strongly pressed against the inner wall 41a. Thus, the foreign matter J caught at the inner portion of the recessed portion 41 can be effectively discharged to the bearing exterior 10.

The embodiment as disclosed above is illustrative in all respects and is not restrictive. In other words, the rolling bearing in the invention is not limited to the illustrated forms but may be in any other form within the scope of the invention.

For example, in the inner peripheral surface 31 (outer peripheral surface 32) of the small-diameter annular portion 11, the multiple recessed portions 41 (recessed portions 42) are formed along the circumferential direction. In the present embodiment, the recessed portions 41 (42) are formed in a discontiguous manner. However, the recessed portions 41 (42) may be contiguously formed.

The rolling bearing depicted in FIG. 1 is the tapered roller bearing 2. However, the configuration in which the recessed portions 41 (42) are formed in the annular portion provided in the cage 6 may be applied to any other rolling bearing. For example, the configuration may be applied to an angular ball bearing. For the rolling bearing in which the inflow direction of the lubricant is constant due to the pump action, the recessed portions may be formed in the inflow-side annular portion. The rolling bearing may be, for example, a deep-groove ball bearing or a cylindrical roller bearing. When the cage has annular portions on both sides in the axial direction, the recessed portions may be formed in the annular portions on both of the sides. The rolling bearing may be a bearing having two rows of rolling elements instead of a bearing having one row of rolling elements. Thus, the cage with the recessed portions in the annular portion can be applied to rolling bearings in various forms.

In the rolling bearing in the invention, a vortex of the lubricant occurs in the recessed portions formed in the annular portion provided in the cage. The foreign matter contained in the lubricant is pressed against the inclined surface of each of the recessed portions due to the centrifugal force of the vortex and is then discharged to the bearing exterior along the inclined surface. Consequently, the foreign matter contained in the lubricant is hindered from entering the bearing interior, enabling shortening of the bearing life to be suppressed.

What is claimed is:
1. A rolling bearing comprising:
an inner ring;
an outer ring;
a plurality of rolling elements interposed between the inner ring and the outer ring; and
an annular cage that holds the rolling elements, wherein
the cage has a small-diameter annular portion provided between the inner ring and the outer ring on a first side of the bearing in an axial direction, a large-diameter annular portion provided between the inner ring and the outer ring on a second side of the bearing in the axial direction, and a plurality of cage bars extending from the annular portion toward a second side of the bearing in the axial direction,
in one or both of an inner peripheral surface and an outer peripheral surface of the small-diameter annular portion, a recessed portion is formed which is open toward a bearing exterior on the first side of the bearing in the axial direction, and no recessed portion open toward the bearing exterior is formed in an inner peripheral surface or an outer peripheral surface of the large-diameter annular portion, and
an inner wall of the recessed portion has an inclined surface that serves to enlarge a cross section of the recessed portion toward the bearing exterior on the first side of the bearing in the axial direction.
2. The rolling bearing according to claim 1, wherein
the inner wall of the recessed portion has side surface portions facing each other in a circumferential direction and a bottom surface portion located between the side surface portions facing each other, and
one or both of a pair of the side surface portions and the bottom surface portion form the inclined surface.
3. The rolling bearing according to claim 1, wherein
in a cross section of the recessed portion, a half of the recessed portion in a circumferential direction and the other half of the recessed portion in the circumferential direction are shaped to be symmetric.
4. The rolling bearing according to claim 1, wherein
a radial dimension of an annular clearance provided between the small-diameter annular portion and a bearing ring that is one of the inner ring and the outer ring that faces the recessed portion is smaller than a radial dimension of the recessed portion at an opening end of the recessed portion on the first side of the bearing in the axial direction.
5. A rolling bearing comprising:
an inner ring;
an outer ring;
a plurality of rolling elements interposed between the inner ring and the outer ring; and
an annular cage that holds the rolling elements, wherein
the cage has an annular portion provided between the inner ring and the outer ring on a first side of the bearing in an axial direction and a plurality of cage bars extending from the annular portion toward a second side of the bearing in the axial direction,
in one or both of an inner peripheral surface and an outer peripheral surface of the annular portion, a recessed portion is formed which is open toward a bearing exterior on the first side of the bearing in the axial direction, and an inner wall of the recessed portion has an inclined surface that serves to enlarge a cross section of the recessed portion toward the bearing exterior on the first side of the bearing in the axial direction, wherein
in a cross section of the recessed portion, a half of the recessed portion in a circumferential direction and the other half of the recessed portion in the circumferential direction are shaped to be symmetric.

* * * * *